(12) United States Patent
Fong

(10) Patent No.: US 6,572,807 B1
(45) Date of Patent: Jun. 3, 2003

(54) METHOD OF IMPROVING SURFACES IN SELECTIVE DEPOSITION MODELING

(75) Inventor: Jon Jody Fong, Calabasas, CA (US)

(73) Assignee: 3D Systems, Inc., Valencia, CA (US)

( * ) Notice: Subject to any disclaimer, the term of this patent is extended or adjusted under 35 U.S.C. 154(b) by 275 days.

(21) Appl. No.: 09/696,785

(22) Filed: Oct. 26, 2000

(51) Int. Cl.⁷ .......................... B29C 41/02; B29C 71/00
(52) U.S. Cl. ...................... 264/237; 264/308; 264/334
(58) Field of Search ........................... 264/237, 308, 264/334

(56) References Cited

U.S. PATENT DOCUMENTS

| | | |
|---|---|---|
| 4,992,806 A | 2/1991 | Peer |
| 5,141,680 A | 8/1992 | Almquist et al. |
| 5,252,264 A | 10/1993 | Forderhase et al. |
| 5,257,657 A | 11/1993 | Gore |
| 5,503,785 A | 4/1996 | Crump et al. |
| 5,555,176 A | 9/1996 | Menhennett et al. |
| 5,617,911 A | 4/1997 | Sterett et al. |
| 6,080,343 A | 6/2000 | Kaufman et al. |

FOREIGN PATENT DOCUMENTS

| | | |
|---|---|---|
| EP | 0 655 317 A1 | 5/1995 |
| EP | 1120228 A2 | 8/2001 |

OTHER PUBLICATIONS

Kowen, "Object Geometries Ltd. Introduces Innovative Three–Dimensional Printer," Object Geometries Ltd., Mar. 13, 2000.

Objet Geometries Ltd., "Object Geometries Ltd. Introduces Innovative Three–Dimensional Printer," Mar. 14, 2000.

Objet Geometries Ltd., "3D Ink–Jet Printer—Quadra," 2000.

Primary Examiner—Leo B. Tentoni
(74) Attorney, Agent, or Firm—Ralph D'Alessandro; James E. Curry

(57) ABSTRACT

An improved selective deposition modeling method which produces a cold weld joint in an object formed by dispensing a single phase change material. The cold weld joint can be controlled so that a lower portion of the object can serve as a support structure for forming the upper portion of the object. Upon separation of the lower and upper portions along the cold weld joint, a downward facing surface is revealed on the upper portion exhibiting superior detail and quality compared to other downward facing surfaces created by conventional selective deposition modeling techniques. The method can readily be adapted for use by selective deposition modeling machines utilizing ink jet print heads dispensing a single phase change material.

23 Claims, 5 Drawing Sheets

METHOD OF IMPROVING SURFACES IN SELECTIVE DEPOSITION MODELING

BACKGROUND OF THE INVENTION

1. Field of the Invention

The invention relates in general to solid freeform fabrication and, in particular, to a method of producing an improved downward facing surface condition on parts produced by selective deposition modeling techniques.

2. Description of the Prior Art

Recently, several new technologies have been developed for the rapid creation of models, prototypes, and parts for limited run manufacturing. These new technologies can generally be described as Solid Freeform Fabrication, herein referred to as "SFF". In SFF, complex parts are produced from a modeling material in an additive fashion as opposed to traditional fabrication techniques, which are generally subtractive in nature. For example, in traditional fabrication techniques material is removed by machining operations or shaped in a die or mold to near net shape and then trimmed. In contrast, additive fabrication techniques incrementally add portions of a build material to targeted locations, layer by layer, in order to build a complex part. Generally, SFF technologies such as stereolithography and the like utilize a computer graphic representation of a part and a supply of a building material to fabricate a part in successive layers. The building material is typically a powder, liquid, or gas. SFF technologies have many advantageous over conventional manufacturing methods. For instance, SFF technologies dramatically shorten the time to develop prototype parts. They also eliminate the need for complex tooling and machining associated with conventional manufacturing methods. In addition, SFF technologies substantially eliminate the production of waste material compared to conventional manufacturing methods.

One category of SFF that has recently emerged is Selective Deposition Modeling, herein referred to as "SDM". In SDM, which is also referred to as solid object imaging, a solid modeling material is physically deposited in successive fashion to form an object. In one type of SDM technology the solid modeling material is extruded as a continuous filament through a resistively heated nozzle. In yet another type of SDM technology the solid modeling material is jetted or dropped in discrete droplets in order to build up a part. Often, a thermoplastic material having a low-melting point is used as the solid modeling material, which is delivered through a jetting system such as those used in the ink jet printers. One type of SDM process utilizing ink jet print heads is described in, for example, U.S. Pat. No. 5,555,176 to Menhennett, et al.

Although all SFF methods have many advantages compared to conventional fabrication methods, they also have inherent problems routed in the layer by layer building process. One of the most fundamental problems associated with SFF processes is the adverse effects resulting from gravitational forces that undesirably act on a part during the build process. All SFF processes must deal with gravitational forces. For example, most downward facing surfaces built by SFF processes need to be supported in order to stabilize the part during the building process. There have been many attempts to counter the undesirable effects of gravity on SFF methods, however, with less than optimal results.

One method of countering the gravity problem is to utilize dissimilar materials in the building process. In one approach a dissimilar material is utilized to produce the support structures that support the part during the build process. For example, two different solidifying materials can be selectively deposited in a layer by layer process, one material for building the part and the other material for building the support structure. Ideally, the materials are carefully selected to order to establish a weak bond joint at their juncture such that the application of an applied force separates the support structure from the part along the joint. For example, this approach is described in U.S. Pat. No. 5,617,911 to Sterett et al. Objet Geometries Ltd., in Rehovot, Israel, is currently developing this approach in conjunction with photopolymer build materials. In another approach the materials are selected such that the material comprising the support structure has a lower melting point than that of the part, and after forming, the temperature of the composite is raised in order to melt out the support structure. This type of approach is described in, for example, U.S. Pat. No. 5,141,680 to Almquist et al. Undesirably, however, the complexity of the material delivery systems is doubled in these approaches in order to account for the delivery of two dissimilar materials.

In yet another approach, a removable support material is deposited in particulate form, such as a powder, that is energized so as to fuse to form the part, with the un-fused powder acting as the support structure. This type of approach is described in, for example, U.S. Pat. No. 5,252,264 to Forderhase et al. Undesirably, however, this approach is limited for use with sintered powder materials and is generally unsuitable in applications utilizing flowable solid modeling materials to build parts.

Another attempt to solve the gravity problem is to provide for the rotation of the part about any axis while the build material is being deposited. This approach is described in, for example, U.S. Pat. No. 6,080,343 to Kaufman et al. Under this approach, the part can be theoretically positioned for optimal alignment with gravity whenever the build material is deposited. Although this approach can eliminate the need to provide a substantial amount of support structures, it cannot eliminate them all, particularly when producing highly complex structures. In addition, integrating a rotational system into an SDM process requires sophisticated equipment, sophisticated controls, and highly trained operators. Thus, rotational SDM systems are often impractical for use in most industries because of their complexity and cost.

Another group of solutions to the gravity problem is to produce structural supports at the same time, and from the same material, as that used to produce the part. The supports are then physically removed after the deposition building process is completed. One such approach produces thin needle like support columns or webs to provide support for downward facing surfaces of the part. For example, this approach is described in U.S. Pat. No. 5,141,680 to Almquist et al. In another approach, break surfaces are established by providing perforations or voids along the locations where downward facing surfaces are to be established. This approach is described in, for example, European Patent Application No. 0655317A1published May 5, 1995. In either approach, it is necessary to forcibly remove the support structures after the SDM building steps are completed. Although these solutions only require the deposition of a single build material, they produce undesirable downward facing surfaces that are rough and jagged. Attempts to improve the appearance of these surfaces have proven problematic because the support structures are strongly fused with the underlying part at their juncture with the downward facing surfaces. Currently, there is no known way to precisely control the surface condition at these junctures during or after severance. After separation, manual cleanup such as scraping, filing, and the like, is often needed in order to improve the appearance of the downward facing surfaces. Undesirably, however, such rework does not achieve the same smoothness and detail as is achieved in forming the upward facing surfaces. As a consequence of the poor surface quality of downward facing surfaces, the parts must be oriented with their most important surfaces facing up prior to being formed by the SDM process. This has proven to be a significant drawback in producing objects under conventional SDM processes.

Thus, there is a need to provide an SDM process capable of establishing downward facing surfaces that have the same surface quality and detail as upward facing surfaces. There is also a need to provide an SDM process that can produce the same quality surface finish on both upward and downward facing surfaces by the deposition of a single build material. There is also a need to provide such an SDM process capable of being performed by a conventional SDM machine without a significant amount of modification. In addition, there is a need to provide an SDM process requiring a minimal amount of training, experience, and hands-on supervision by its operators. These and other difficulties of the prior art have been overcome according to the present invention.

BRIEF SUMMARY OF THE INVENTION

The present invention provides its benefits across a broad spectrum of SFF processes. While the description which follows hereinafter is meant to be representative of a number of such applications, it is not exhaustive. As those skilled in the art will recognize, the basic methods taught herein can be readily adapted to many uses. It is intended that this specification and the claims appended hereto be accorded a breadth in keeping with the scope and spirit of the invention being disclosed despite what might appear to be limiting language imposed by the requirements of referring to the specific examples disclosed.

It is one aspect of the present invention to provide a method of creating an object by SDM techniques whose downward facing surfaces exhibit superior quality and detail compared to downward facing surfaces created by conventional SDM techniques.

It is another aspect of the present invention to provide a method of creating an improved downward facing surface on an object that is severable from a support structure wherein the object and support structure are formed by SDM techniques dispensing a single build material.

It is yet another aspect of the invention to provide a method of establishing a separation zone or cold weld joint in an object formed by SDM techniques wherein the object can be precisely severed along the joint.

It is a feature of the present invention to establish a separation zone in an object formed by an SDM process by selectively dispensing a single phase change material to a plurality of target locations. The separation zone, or cold weld joint, is established by selectively dispensing the phase change material such that the outer surface temperature of the dispensed material is below the flowable temperature of the material when striking the target locations residing in the separation zone. This assures that the dispensed material has insufficient energy to integrally fuse with material adjacent the target locations.

It is another feature of the present invention to establish a first portion and a second portion of an object severably attached along a separation zone formed by the process mentioned above. The first portion and the second portion are established by selectively dispensing the phase change material such that the internal volume temperature of the dispensed material is equal to or greater than the flowable temperature of the material when striking target locations residing in the first and second portions. This assures that the dispensed material has sufficient energy to integrally fuse with the material that is adjacent to the target locations.

It is yet another feature of the present invention to provide an SDM process as discussed above wherein the first portion of the object is a support structure for the second portion, and upon separation of the first and second portions along the separation zone a desired surface is revealed on the second portion. Upon separation the second portion becomes the resultant product formed by the method.

It is still yet another feature of the present invention to provide an SDM process as discussed above wherein upon separation of the first and second portions along the separation zone, a desired surface is revealed on both portions thereby establishing mirror image parts.

It is still yet another feature of the present invention to provide an SDM process as discussed above wherein the phase change material is dispensed in discrete droplets from at least one ink jet print head at a temperature at or above the flowable temperature of the material, and the temperature of the droplets is regulated as they cool in flight. One manner of regulating the temperature of the droplets in flight is by adjusting the distance between the ink jet print head and the target locations, another is by altering the size of the droplets when dispensed, and yet another is by altering the ambient temperature in which they travel.

It is an advantage of the present invention that an improved downward facing surface is established on parts made by the SDM process resulting from the creation of the separation zone or cold weld joint along the object. The surface is improved by having significantly clearer resolution, smoothness, and definition as compared to downward facing surfaces created by conventional SDM processes.

It is another advantage of the present invention that manual cleanup operations such as scraping and filing are no longer needed on downward facing surfaces created by SDM processes that dispense a single phase change material for both the resultant product and the support structure.

It is yet another advantage of the present invention that the improvement in the appearance and quality of downward facing surfaces formed by the SDM process can be achieved without dispensing dissimilar phase change materials or a release agent.

Other aspects, advantages, and novel features of the present invention will become apparent from the following detailed description of the invention.

BRIEF DESCRIPTION OF THE DRAWINGS

Referring particularly to the drawings for the purposes of illustration and not limitation.

DETAILED DESCRIPTION OF THE PREFERRED EMBODIMENTS

The present invention will now be described more fully with reference to the accompanying drawings, in which preferred embodiments of the invention are shown. The invention may, however, be embodied in many different forms without departing from the spirit and scope of the accompanying claims. In reference to the drawings, like reference numbers refer to similar or identical elements throughout the several views.

Figure 1:
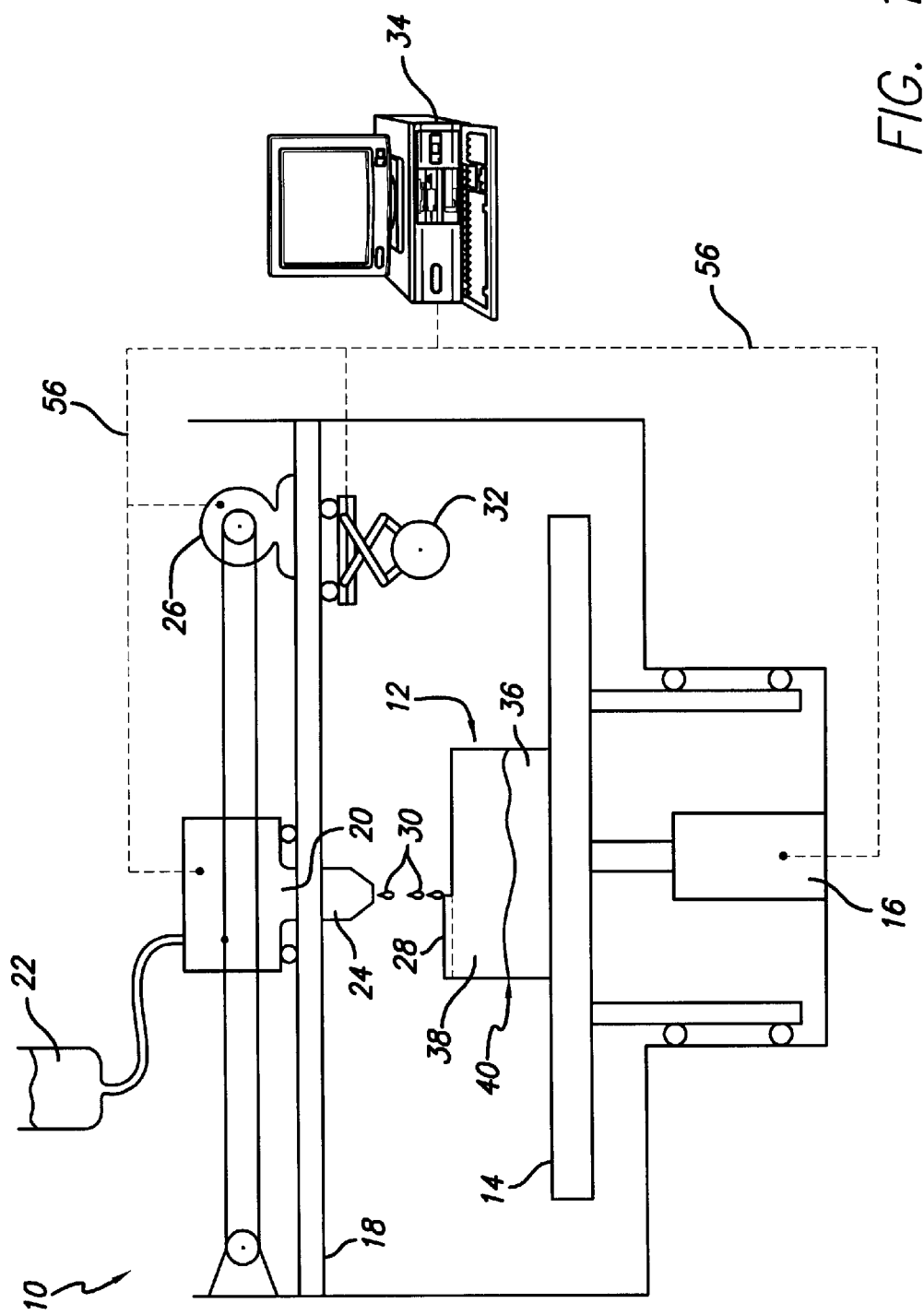
FIG. 1 is a schematic side view of an apparatus for carrying out the present invention process.

Referring particularly to FIG. 1, there is illustrated generally by the numeral 10 an SDM apparatus for carrying out the present invention forming process. The SDM apparatus 10 is shown building a three-dimensional object shown generally by the numeral 12. The object is built in a layer by layer manner and resides on a build platform 14 that can be precisely positioned vertically by any conventional actuation means 16. Directly above and parallel to the platform 14 is a rail system 18 on which a material dispensing trolley 20 resides. The dispensing trolley is fed a phase change material from a material reservoir 22 that heats the material above its flowable temperature. Located on the dispensing trolley is at least one ink jet print head 24 for dispensing the phase change material. Preferably the ink jet print head 24 is of the piezoelectric type having a plurality of dispensing orifices, however other ink jet print head types could be used, such as an acoustic or electrostatic type. Alternatively a thermal spray nozzle could be used, if desired. The trolley is reciprocally driven along a horizontal path by a conventional drive means 26. Generally, it takes multiple passes of the trolley 20 to dispense one layer of material from the ink jet print head 24 onto respective target locations for a given layer. In FIG. 1, a portion of a layer of dispensed material 28 is shown as the trolley has just started its pass from left to right. Dispensed droplets 30 are shown in mid-flight on their way to impact target locations on the object 12. The distance between the dispensing orifices of the ink jet print head 24 and the layer 28 of discrete droplets of material is greatly exaggerated for ease of illustration.

Preferably, an external computer 34 generates a solid modeling CAD data file containing three-dimensional coordinate data of an object, commonly referred to as an STE file. When a user desires to build an object, a print command is executed at the external computer in which the STL file is processed through print client software and sent to the SDM apparatus 10 as a print job. For purposes of describing the present invention, the object to be built comprises a first portion 36 and a second portion 38 severably attached along a separation zone 40. In the CAD file representation of the object, the separation zone is the downward facing surface of the second portion 38 of the object. Thus, it is desirable to precisely define the downward facing surfaces of the object and then assign these surfaces as the separation zone to be formed by the SDM process. The CAD object data, typically in STL format or its equivalent can be processed and transmitted to the SDM apparatus by any conventional data transferable medium desired, such as by magnetic disk tape, microelectronic memory, or the like. The data transmission route and controls of tie SDM apparatus arc represented as dashed lines at 56. One SDM apparatus capable of being adapted to practice the present invention is the ThermoJet® solid object printer, sold by 3D Systems, Inc., of Valencia, Calif. This apparatus, like others, utilizes a planarizer 32 in order to successively flatten the layers as needed so as to eliminate the accumulated effects of drop volume variation, thermal distortion, and the like.

The process of the present invention performed by the apparatus discussed above involves dispensing a single phase change material to a plurality of target locations to form an object 12. The material is selectively dispensed to form a first portion 36, selectively dispensed to form a separation zone 40, and selectively dispensed to form a second portion 38. Alternatively, the process can also be performed without dispensing material to form the separation zone, by cooling the first portion prior to dispensing material to form the second portion to form the separation zone. The first portion and second portion of the object are severably attached along the separation zone, and upon separating these portions an improved downward facing surface 54 is established on the second portion. In one embodiment, the first portion serves as a support structure for forming the second portion that is the resultant product formed by the process, often referred to as a prototype part. In another embodiment the first portion and second portion are formed to be mirror image parts, and upon separation both portions become prototype parts at the end of the process.

The first portion 36 and second portion 38 of the object of FIG. 1 are formed by conventional SDM techniques, that is, by selectively dispensing the phase change material in successive layers such that the material fuses with the material of the previous layer. This SDM technique is well known in the art and is described in, for example, U.S. Pat. No. 4,992,806 to Peer. Preferably the phase change material is dispensed in a plurality of discrete droplets to target locations residing on each successive layer of the object. Alternatively, the basic method taught herein may also be adapted for use in SDM systems which dispense a continuous stream of material. When depositing discrete droplets, each layer of the object is divided into a plurality of pixels, in which case a target location may be assigned to a given pixel location. Generally, when the volume of the droplets are of a sufficient size that, once deposited, they effectively cover the area of a pixel that has been targeted, the dispensing of the droplets on the target locations result in a solid fill condition.

The first portion 36 and second portion 38 of the object 12 are formed by conventional SDM techniques, that is, by selectively dispensing the phase change material in successive layers such that the material fuses with the material of the previous layer. This SDM technique is well known in the art and is described in, for example, U.S. Pat. No. 4,992,806 to Peer. Preferably the phase change material is dispensed in a plurality of discrete droplets to target locations residing on each successive layer of the object. Alternatively, the basic method taught herein may also be adapted for use in SDM systems which dispense a continuous stream of material. When depositing discrete droplets, each layer of the object is divided into a plurality of pixels, in which case a target location may be assigned to a given pixel location. Generally, when the volume of the droplets are of a sufficient size that, once deposited, they effectively cover the area of a pixel that has been targeted, the dispensing of the droplets on the target locations result in a solid fill condition.

A common pixel resolution for building SDM parts is between about 300 to 600 dots-per-inch. Greater resolution is possible, but at the expense of increasing build time. It is well known that the selective application of a solid fill condition forms excellent finishes on upward facing surfaces of parts formed by SDM techniques. This generally results from the ability to precisely control the targeting of each individual droplet to accurately strike a respective target location. Inkjet print heads arc ideal for achieving a solid fill condition by precisely dispensing discrete droplets 42 of a phase change material. Such phase change materials are thermally flowable materials; that is, they are normally ill a solid phase at ambient temperature but change to liquid phase, it an elevated temperature. The temperature at which this change occurs is herein referred to as the flowable temperature of the material. The most suitable phase change materials for use with ink jet print heads are those that change to a liquid phase when heated to an elevated temperature in a material reservoir 22 of an ink jet printing device. Such materials have generally low flowable temperatures, generally between around 50–350° C. In general, the droplets are dispensed in the flowable or liquid state and start to cool as they travel in the ambient air towards their target locations. Each droplet has an internal volume and a corresponding internal volume temperature. When operating in the solid fill condition, the internal volume temperature must be equal to or greater than the flowable temperature of the material when the droplets strike the target locations. This is necessary in order for each droplet 42 to have sufficient energy to integrally fuse with adjacent material in the layer, and also with the material deposited in the previous layer. Generally, the first portion and second portion of the object are both formed in this solid fill manner.

A common pixel resolution for building SDM parts is between about 300 to 600 dots-per-inch. Greater resolution is possible, but at the expense of increasing build time. It is well known that the selective application of a solid fill condition forms excellent finishes on upward facing surfaces of parts formed by SDM techniques. This generally results from the ability to precisely control the targeting of each individual droplet to accurately strike a respective target location. Ink jet print heads are ideal for achieving a solid fill condition by precisely dispensing discrete droplets 30 of a phase change material. Such phase change materials are thermally flowable materials; that is, they are normally in a solid phase at ambient temperature but change to liquid phase at an elevated temperature. The temperature at which this change occurs is herein referred to as the flowable temperature of the material. The most suitable phase change materials for use with ink jet print heads are those that change to a liquid phase when heated to an elevated temperature in a material reservoir 22 of an ink jet printing device. Such materials have generally low flowable temperatures, generally between around 50–350° C. In general, the droplets are dispensed in the flowable or liquid state and start to cool as they travel in the ambient air towards their target locations. Each droplet has an internal volume and a corresponding internal volume temperature. When operating in the solid fill condition, the internal volume temperature must be equal to or greater than the flowable temperature of the material when the droplets strike the target locations. This is necessary in order for each droplet 42 to have sufficient energy to integrally fuse with adjacent material in the layer, and also with the material deposited in the previous layer. Generally, the first portion and second portion of the object are both formed in this solid fill manner.

Figure 2:
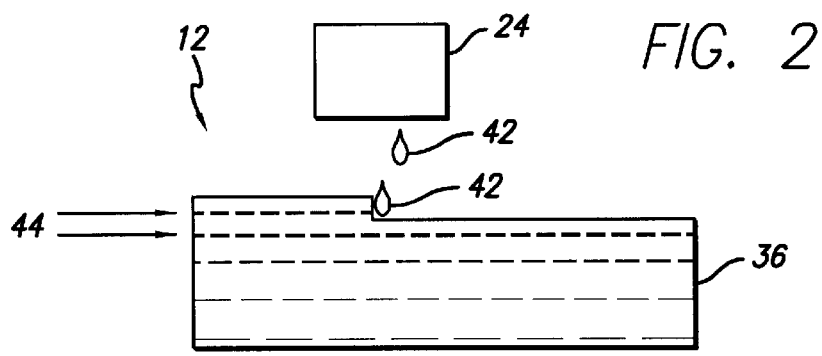
FIG. 2 is a side view of a first portion of an object being formed by the present invention process.
Figure 3:
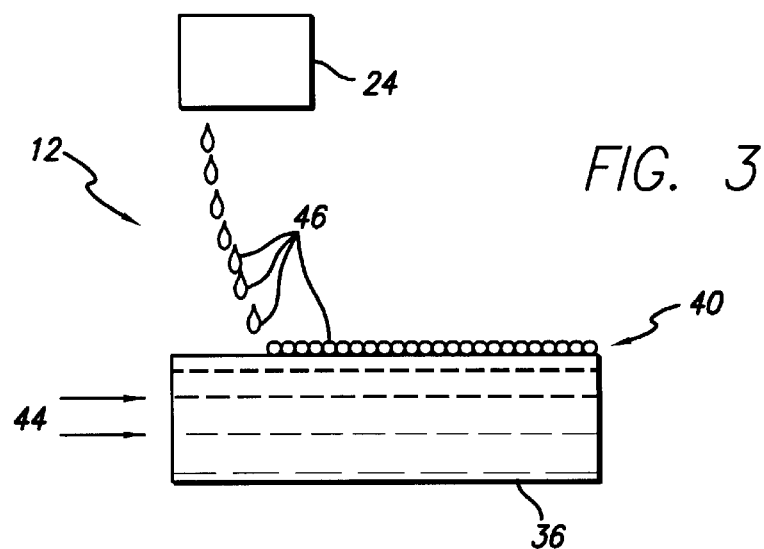
FIG. 3 is a side view of the separation zone being formed on the first portion of the object by the present invention process.
Figure 4:
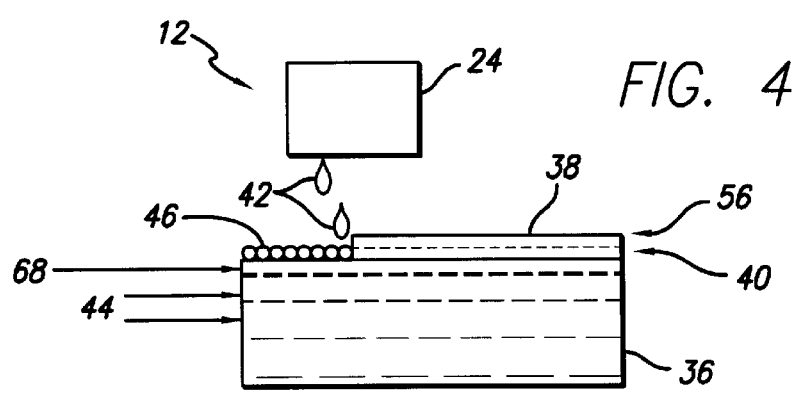
FIG. 4 is a side view of the second portion being formed on the separation zone by the present invention process.
Figure 5:
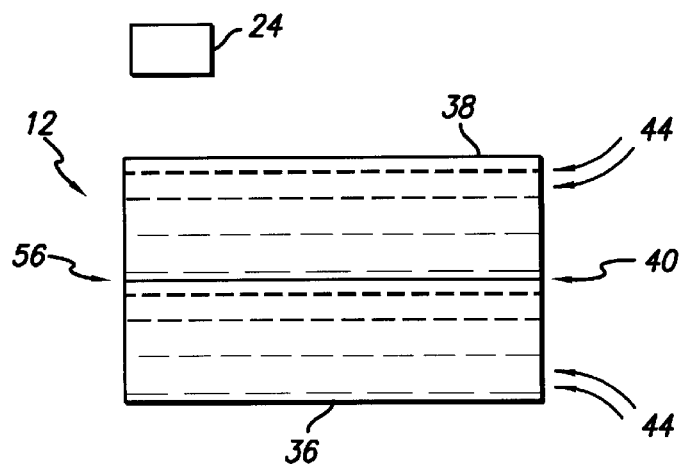
FIG. 5 is a side view of the object upon the completion of dispensing the phase change material of the present invention process.

Referring to FIGS. 2 through 6, the SDM formed object 12 is shown in greater detail. The first and second portions, 36 and 38 respectively, are formed generally by the conventional SDM techniques discussed above. In FIGS. 2 and 4, discrete droplets 42 of a phase change material are selectively dispensed to selected target locations in a layer by layer fashion to fuse with adjacent material. Each formed layer 44 comprises a plurality of pixel locations to be selectively chosen as target locations that, when impacted by the discrete droplets of material, establish a solid fill condition for the first and second portions. Selecting which pixel locations are to be assigned as target locations is preferably determined when the CAD file object data is processed.

Unique to the present invention is the establishment of the separation zone or cold weld joint, shown generally at numeral 40 in FIGS. 1 and 3 through 5. The discrete droplets of material deposited in the separation zone, shown at numeral 46 in FIGS. 3 and 4, are selectively dispensed such that the outer surface temperature of these droplets are below the flowable temperature of the material when they strike the target locations in the separation zone. Preferably, the internal volume temperature of these droplets 46 is at or below the flowable temperature of the material. Generally, this assures that each dispensed droplet 46 lacks sufficient energy to integrally fuse with the material deposited in the previous layer. Some adhesion between these droplets and the lower surface occurs, however, the bond is generally weak compared to the bond formed among droplets dispensed in forming a solid fill condition. At least one layer of droplets 46 is desired to be deposited in the separation zone so the droplets can comprehensively act in a cohesive manner to prevent the formation of a strong bond between the first portion and second portion. FIG. 3 shows one layer of droplets 46 in the process of being deposited into the separation zone 40 prior to forming the second portion of the object.

Not to be limited to any theory of operation, it is believed that when the droplets 46 impact the target locations in the separation zone, they have insufficient energy to integrally fuse with either the adjacent droplets 46, or the integrally fused material deposited in the last layer 68 of the first portion. This establishes a mechanically weak joint between the first portion 36 and the second portion 30 which, according to conventional wisdom in the art, is an unsatisfactory condition that presents sufficient grounds to reject parts. Thus, according to the prior art, a separation zone or cold weld joint is an undesirable condition that is to be avoided when producing parts by SDM. Unexpectedly, however, it has been found that by precisely controlling the formation of a separation zone or cold weld joint at the location of an intended downward facing surface of an object to be formed by SDM, a significant improvement in the appearance and quality of the downward facing surface is achieved.

In an alternative embodiment, a separation zone or cold weld joint is established without dispensing droplets in the separation zone. This is accomplished by forming the first portion with an SDM apparatus operating in a solid fill mode, and then allowing the first portion sufficient time to cool before depositing the material to form the second portion. The first portion is allowed to cool to a point where material dispensed in a typical solid fill condition would lack sufficient energy to integrally fuse with the first portion. As those in the art realize, the amount of cooling needed will depend on such variables as the properties of the dispensed material, the size of the object, the size of the droplets, the ambient temperature, and the like. By allowing the first portion to sufficiently cool prior to forming the second portion, the material dispensed to form the second portion will lack sufficient energy to initiate fusion with the last layer of the first portion, however it will have sufficient energy to integrally fuse with adjacent material forming the second portion. In this manner a separation zone or cold weld joint can be established between the two portions. One drawback to this embodiment is that the build cycle time is substantially increased as a result of the additional time needed to allow the first portion to cool which, for example, can exceed twenty minutes or more. The cooling time can be shortened by providing an active cooling system to the apparatus, but at additional expense. Another drawback to this embodiment is that in many instances it is, difficult to achieve a clean separation between the first and second portions along the separation zone. In addition, since the first portion must be completed in its entirety and cooled prior to forming the second portion, this embodiment is limited to simple geometric configurations as the dispensing steps cannot be alternated or staggered according to a predetermined sequence. Thus, selectively dispensing droplets 46 in order to form the separation zone is preferred because it is a faster process and is better suited for forming parts having complex geometric configurations.

Referring back to the preferred embodiment, FIG. 4 shows the first layer 56 of dispensed droplets 42 being deposited on top of the separation zone 40 to initiate the formation of the second portion 38. These droplets are deposited in the same manner as done in establishing a solid fill condition. It is believed that this first layer 56 of material dispensed above the separation zone integrally fuses with the discrete droplets 46 in the separation zone. During this fusion, the lower surfaces of the droplets 46 yield under gravitational forces and conform to establish a smooth surface condition in the separation zone without strongly adhering with the last layer 68 of the first portion 36. It is important that the energy introduced in dispensing of the first layer 56 of droplets 42 on the separation zone does not cause the discrete droplets 46 in the separation zone to integrally fuse with the first portion 36. This can be controlled by increasing the number of layers of discrete droplets 46 deposited in the separation zone, or by decreasing the droplet size of the solid fill condition, if needed.

Figure 9:
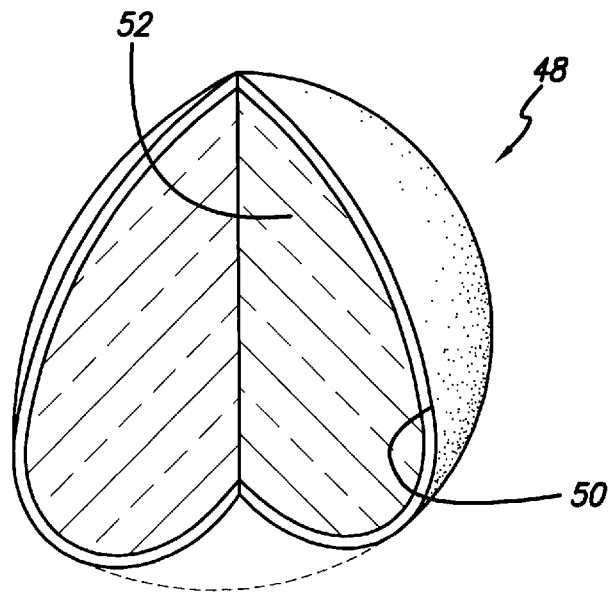
FIG. 9 is an isometric view of a dispensed droplet of phase change material shown partially sectioned.

Referring to FIG. 9, a droplet of dispensed material is shown partially sectioned at 48. The droplet 48 has an outer surface 50 and internal volume 52. When depositing droplets of material to form the first and second portions of the object, it is necessary that the temperature of the internal volume 52 of the droplet be equal to or greater than the flowable temperature of the material when striking its intended target location. This is desired so as to assure that each droplet will integrally fuse with the adjacent material of the previous layer. As used herein, the term "integrally fuse" or "integrally fused" refers to the condition in which a dispensed droplet of material bonds with the outer surface of adjacent material such that the bond achieves the same or equivalent mechanical properties as that which exists within a single solidified droplet. When depositing the droplets 46 in the separation zone, it is important they do not establish an integrally fused condition with adjacent material. Thus, when depositing droplets in the separation zone according to the present invention, it is important that the outer surface temperature of the droplets at least be below the flowable temperature of the material when they strike their target locations. The internal volume temperature of the droplets could also be at or below the flowable temperature of the material when striking the target locations residing in the separation zone, if desired. The separation zone could also be established by dispensing the droplets of material such that they are completely solid prior to striking the target locations, however it is not required. Alternatively, solid droplets of material could be dispensed into the separation zone, but providing such a system would require an additional material dispensing mechanism and undesirably increase the complexity of the apparatus. If desired, such a delivery system could be provided according to the present invention.

There are many variables that influence the creating of the separation zone, or cold weld joint, according to the present invention. Some variables are directly related to the intrinsic properties of material dispensed, such as its flowable temperature and viscosity. Other variables, such as the droplet size of the material, the drop distance of the material to the target zone, the velocity of the droplets upon impact, the reciprocation rate of the trolley, the ambient temperature during deposition, and the like, also influence the resultant separation zone. Iterations are needed to determine the optimal parameters necessary to carry out the present invention for a specific material and/or given apparatus.

Figure 8:
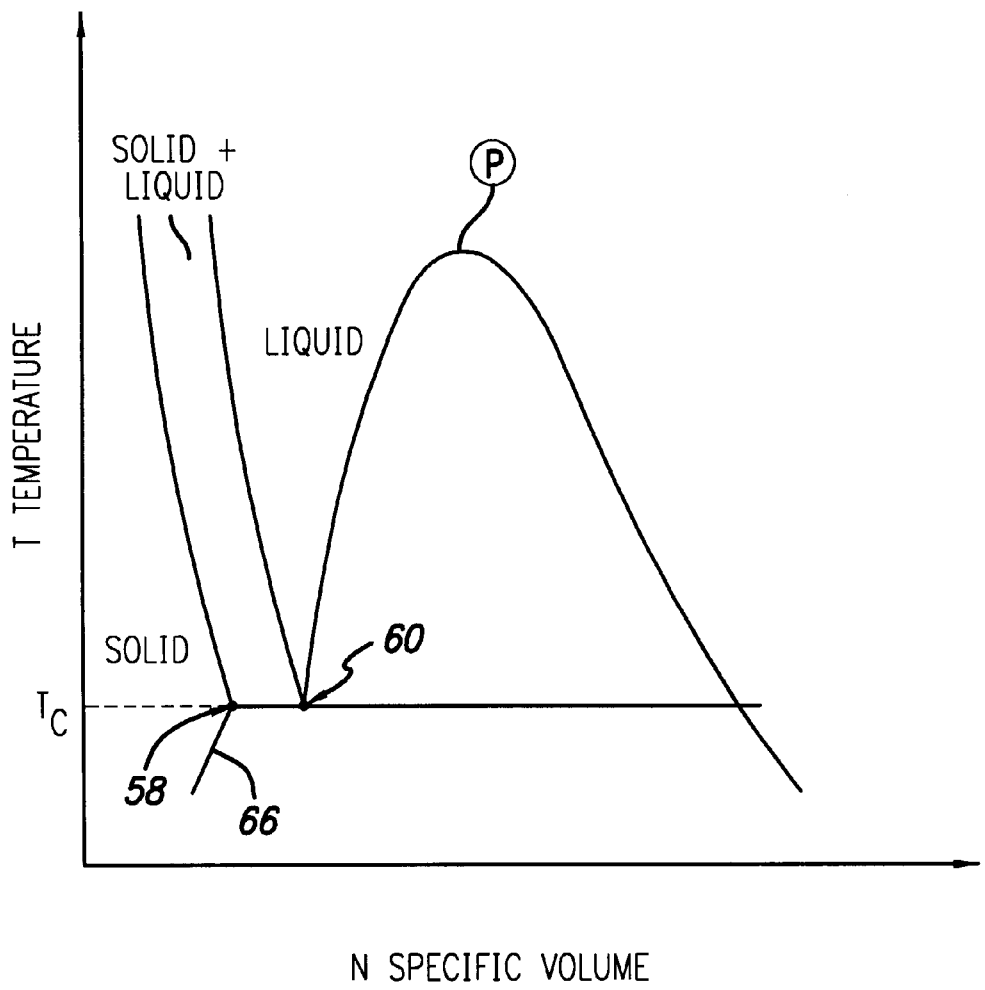
FIG. 8 is a phase change chart showing specific volume vs. temperature for a phase change material to be dispensed according to the present invention process.

It is first necessary to select a phase change material for the SDM process prior to determining the optimal parameters to establish a separation zone. When using ink jet deposition equipment to build an object, a low melt point thermoplastic is preferred. FIG. 8 is a representative phase diagram for thermoplastics used in SDM processes. At atmospheric pressure, most thermoplastic materials will reside on the constant pressure line identified at 66. When solid, and when heat is gradually added to the material, a phase change starts to occur at a first saturation point 58. The first saturation point 58 is commonly referred to as the freeze point, which occurs generally at temperature $T_c$. This is the point where the material starts to change from solid to liquid. As more heat is added to the material, more of the material changes to liquid until a second saturation point 60 is reached. The second saturation point 60 is commonly referred to as the melt point, where all of the material is liquid. This also occurs generally at temperature $T_c$, although for some thermoplastic materials $T_c$ may fluctuate within a small temperature range between the two saturation points. As used herein, the "flowable temperature" of the phase change material refers to temperature $T_c$ and also to the small temperature range of $T_c$ for those materials whose temperature fluctuates within the range between the two saturation points. Preferably, when dispensing the phase change material to form the first and second portion, the internal volume temperature of the droplets must be equal to, or preferably greater than, the flowable temperature when they strike the target locations. This assures that the dispensed material integrally fuses with the material deposited in the previous layer. When dispensing the phase change material to form the separation zone or cold weld joint, the outer surface temperature of the droplets must be below the flowable temperature of the material when striking the target locations. This assures that the outer surface of the droplets is below the freeze point 58 for the given phase change material so that the droplets do not integrally fuse with the previous layer. Ideally, the droplets 46 in the separation zone form a layer of loosely bonded, evenly spread, coating of particles.

Figure 10:
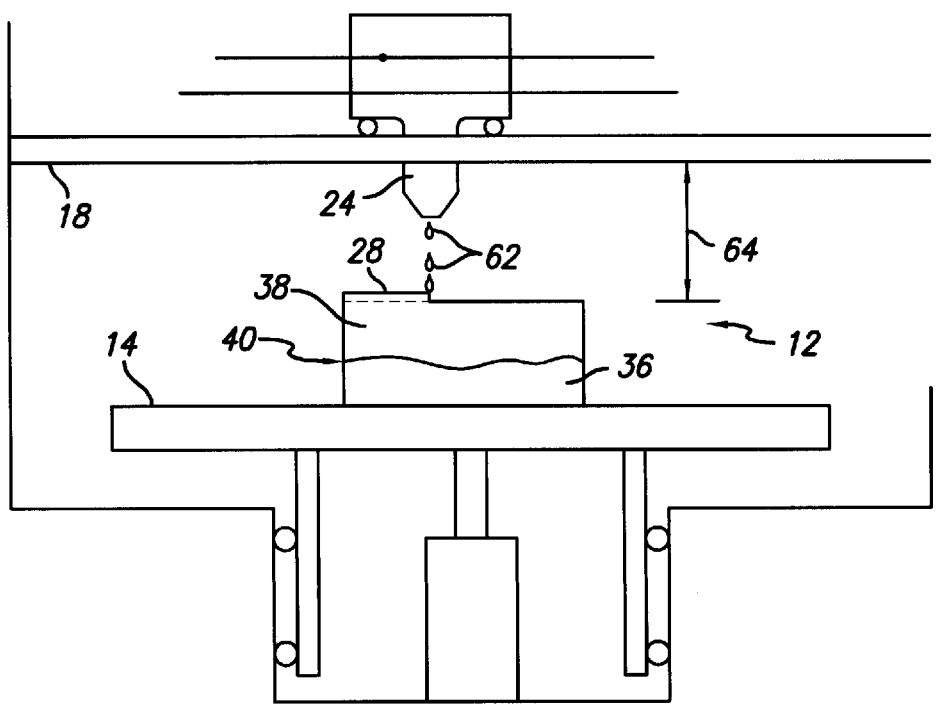
FIG. 10 is a schematic side view of an apparatus for carrying out an embodiment of the present invention process.

Controlling the temperature of the dispensed material when striking the target locations can be accomplished in a number of ways. For example, the dispensing apparatus could alter the temperature of the material prior to exiting the dispensing nozzle. However, when utilizing ink jet print heads, which dispense the material above the flowable temperature of the material, it is preferred to regulate the temperature of the droplets as they cool in flight by adjusting the distance they must travel in air between the ink jet print head and the target locations. This is generally easier to accomplish since ink jet print heads dispense material in the molten phase and within a generally fixed temperature range. Referring to FIG. 10, a prearranged distance 64 can be selected in order to allow the dispensed droplets 62 sufficient time to cool to the desired temperature when striking the target locations. This is preferred since most SDM systems are configured for making vertical adjustments when forming objects in successive layers. In FIG. 10, raising or lowering the platform 14 alters the distance 64 between the ink jet print head and the layer of the object being built. Alternatively, this distance can be adjusted by raising and lowering the ink jet print head while holding the platform held stationary, if desired.

In the preferred embodiment, the temperature or energy of the droplets when striking the target locations is controlled by adjusting the distance between the ink jet print head and the target locations of a given layer in order to allow the droplets sufficient time to cool during flight. In the preferred embodiment, ThermoJet® solid object printer, sold by 3D Systems, Inc., of Valencia, Calif. was modified to practice the present invention by establishing a first predetermined distance between the ink jet print head and a given layer for forming the first and second portions of the object, and a second predetermined distance for forming the separation zone or cold weld joint. The first predetermined distance was determined to be between about 0.025 and about 0.040 inches while the second predetermined distance was determined to be between about 1.5 to about 2.0 inches. Generally the second predetermined distance is substantially greater than the first predetermined distance in order to allow each droplet, once dispensed, sufficient time to cool down to the desired state when striking the target location. Changing the drop distance to control droplet temperature is preferred so as to avoid the complexity and expense of actively monitoring and controlling the state of the deposited material when exiting the ink jet print head nozzle. However such control system could be used, if desired.

Generally, the targeting accuracy is reduced when the drop distance 64 is increased, and at some point targeting accuracy is completely lost, wherein the ability to accurately strike a pixel location with an individual droplet is gone. Because of this, most SDM machines maintain the drop distance between about 0.025 to about 0.100 inches. However, it has been discovered that when depositing droplets in the separation zone, targeting accuracy is not needed when depositing droplets in a solid fill condition. For example, when depositing droplets in the separation zone, each individual pixel location need not be individually targeted, but rather, a random scattering of droplets over the separation zone is sufficient. Successful separation zones have been achieved, for instance, by dispensing only about ⅓ of the number of droplets 46 in one pass of the reciprocating trolley compared the number of pixels in the separation zone, and then repeating the passes to randomly build a sufficient layer of droplets. Thus, the need to achieve targeting accuracy for each droplet is not needed, making it possible to raise the drop distance 64 as high as 1.5 to 2.0 inches or more when depositing material in the separation zone.

In an alternative embodiment, the size of a droplet can be adjusted in order to regulate the state or phase of the droplets when striking a target location. For instance, the ink jet print heads incorporated in the ThermoJet® solid object printer have the ability to adjust the droplet volume size in increments of ⅓ maximum size to ⅔ maximum size. By reducing the volume size of a droplet, the surface to volume ratio of the droplet increases, which allows the droplets to cool at a faster rate. Thus, the droplets can have a prearranged size when being dispensed, and the prearranged size can be altered in order to achieve the desired temperature when they strike the target locations. Thus, reducing the size o[]f the droplets when they are dispensed can also regulate the temperature of the droplets. This technique can be combined with altering the predetermined drop distances as well. Thus, the prearranged distinct and prearranged size of the droplets can be selected in order to regulate the temperature of the droplets as they strike the target locations of a given layer in each selective dispensing step. When combined, targeting accuracy could be increased when depositing material in the separation zone because the length needed for the second predetermined distance can be reduced. In addition, the ambient temperature of the air in which the droplets travel could be regulated as well.

Figure 7:
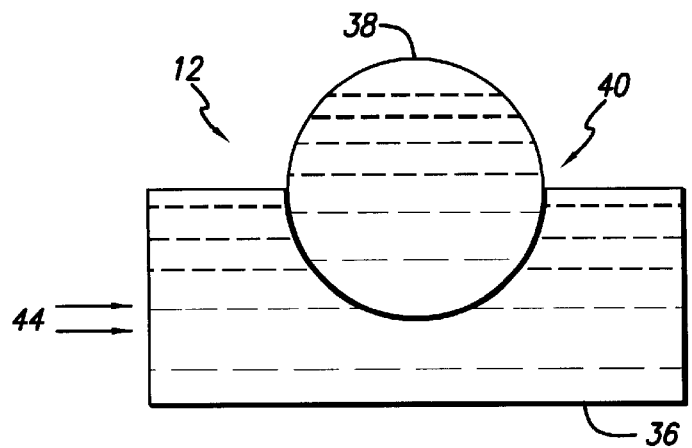
FIG. 7 is a section view of another object created by the present invention process wherein the selective dispensing steps are executed in a predetermined sequence in order to form the object.

It is to be appreciated that the steps of dispensing of material to form the first portion, second portion, and separation zone, can be selectively executed according to any predetermined sequence desired. Developing a predetermined sequence for dispensing the material is fundamentally governed by geometric considerations of a desired object or part to be formed, and is to be determined on a part by part basis. For example, referring to FIG. 7, to create the spherical shape for the second portion 38, the separation zone 40 will take on a deep semi-spherical shape. In order to dispense the material to establish the first portion 36, second portion 38, and separation zone 40, it may be necessary to alternate or stagger the dispensing steps when building the object layer by layer. This is because it may not be possible to complete the first portion in one continuous dispensing step, then form the separation zone in one continuous dispensing step, and then form the second portion in one continuous dispensing step. This is particularly true for configurations having cavities or pockets that are deeper than the prearranged distance 64 selected for a given SDM apparatus. Therefore, due to the multitude of geometric shapes and configurations possible for objects created by the present invention SMD process, the three dispensing steps may be alternated as needed according to a predetermined sequence chosen for a given geometric configuration. Thus, it is often desirable to develop a predetermined sequence for the three dispensing steps that is specifically tailored for building a given object.

Figure 6:
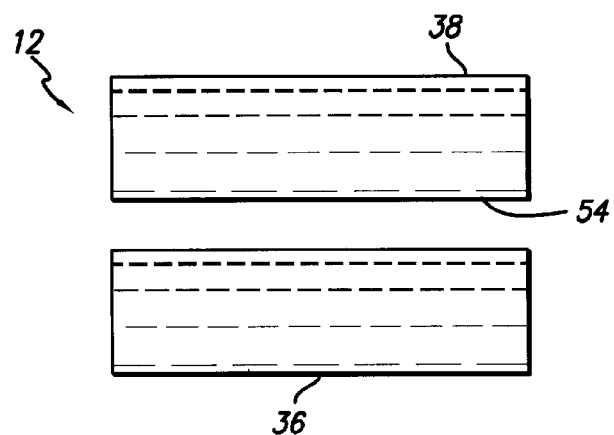
FIG. 6 is a side view of the first portion and second portion of the object after being separated along the separation zone.

After establishing the first portion, second portion, and separation zone, the first and second portions can easily be separated along the separation zone. Preferably, a generally normal bending force is to be applied to the first portion around the separation zone to initiate separation. This is preferred particularly when the first portion is the support structure that is to be discarded after separation, as excessive application of bending forces to the first portion could cause it to break. In the preferred embodiment, substantially superior downward facing surfaces have been achieved upon separation of the portions along the separation zone. Referring to FIG. 6, the object 12 is shown after having been separated, thereby revealing the desired surface 54 on the second portion 38. Preferably, the first portion represents a support structure 36 for the second portion 38, which in turn becomes the resultant product of the process. When the second portion is intended as the resultant product, the support structure may be discarded or recycled, if desired. In an alternative embodiment, the first and second portions can be separated to form mirror parts, if desired. The surface quality of the resultant surface 54 is substantially equivalent to the surface quality of the upward facing surfaces established by standard SDM techniques. Thus, a significant improvement is realized in the surface condition of the finished part. No longer is it necessary to build web-like support structures adjacent downward facing surfaces of SDM modeled parts. Overall surface quality is substantially improved, and the need for manual cleanup operations such as scraping, filing, and the like, is substantially eliminated. No longer is it critical to orient a three-dimensional part such that the most unimportant surfaces are built in a face down position as required in previous SDM processes.

What has been described are preferred embodiments in which modifications and changes may be made without departing from the spirit and scope of the accompanying claims.

What is claimed is:

1. A method for solid freeform fabrication of an object by dispensing a material to a plurality of target locations, the object having a first portion and a second portion severably attached along a separation zone, the method comprising the steps of:
    selectively dispensing the material to form the first portion, the dispensed material having an internal volume temperature being equal to or greater than the flowable temperature of the material when striking the target locations residing in the first portion;
    selectively dispensing the material to form the separation zone, the dispensed material having an outer surface temperature being below the flowable temperature of the material when striking the target locations residing in the separation zone;
    selectively dispensing the material to form the second portion, the dispensed material having an internal volume temperature being equal to or greater than the flowable temperature of the material when striking the target locations residing in the second portion.

2. A method as described in claim 1 wherein the object is fabricated in successive layers and the selective dispensing steps are performed according to a predetermined sequence in order to form the first portion, the second portion, and the separation zone.

3. A method as described in claim 2 wherein the material is a phase change material being dispensed in a plurality of discrete droplets from at least one ink jet print head to the target locations on each successive layer.

4. A method as described in claim 3 wherein the temperature of the droplets are at or above the flowable temperature of the material when the droplets exit the ink jet print head.

5. A method as described in claim 4 wherein the droplets start to cool upon being dispensed from the ink jet print head, the ink jet print head being positioned at a prearranged distance from each successive layer when dispensing the droplets, the prearranged distance being selected in order regulate the temperature of the droplets to achieve the desired temperature when they strike the target locations of a given layer in each selective dispensing step.

6. A method as described in claim 5 wherein in forming the separation zone the prearranged distance is substantially increased.

7. A method as described in claim 6 wherein a first prearranged distance is used when selectively dispensing the material to form the first and second portions of the object, and a second prearranged distance is used when selectively dispensing the material to form the separation zone.

8. A method as described in claim 7 further comprising the step of:
    separating the first and second portion of the object along the separation zone to reveal a desired surface on the second portion, the second portion being the resultant product, and the first portion being a support structure formed by the method to support the resultant product formed by the method.

9. A method as described in claim 7 further comprising the step of:
    separating the first and second portion of the object along the separation zone to reveal a desired surface on both the first portion and the second portion, the first and second portions being mirror image parts.

10. A method as described in claim 4 wherein the droplets start to cool when dispensed from the ink jet print head, the droplets having a prearranged size when being dispensed, the prearranged size being selected to regulate the temperature of the droplets to achieve the desired temperature when they strike the target locations of a given layer in each selective dispensing step.

11. A method as described in claim 10 wherein in forming the separation zone the prearranged size of the droplets is substantially decreased.

12. A method as described in claim 11 wherein the ink jet print head is positioned at a prearranged distance from each successive layer when dispensing the droplets, the prearranged distance and the prearranged size of the droplets are selected in order to regulate the temperature of the droplets to achieve the desired temperature when they strike the target location of a given layer in each selective dispensing step.

13. A method as described in claim 12 wherein in forming the separation zone the prearranged distance is substantially increased.

14. A method for solid freeform fabrication of an object by dispensing a material to a plurality of target locations, the object having a first portion and a second portion severably attached along a cold weld joint, the method comprising the steps of:
    selectively dispensing the material from at least one ink jet print head in a plurality of discrete droplets to form the first portion, the dispensed material having sufficient energy to integrally fuse with adjacent material when striking the target locations residing in the first portion;
    selectively dispensing the material from the at least one ink jet print head in a plurality of discrete droplets to form the cold weld joint, the dispensed material having insufficient energy to integrally fuse with adjacent material when striking the target locations residing in the cold weld joint;
    selectively dispensing the material from the at least one ink jet print head in a plurality of discrete droplets to form the second portion, the dispensed material having sufficient energy to integrally fuse with adjacent material when striking the target locations residing in the second portion.

15. A method as described in claim 14 wherein the object is fabricated in successive layers and the selective dispensing steps are performed according to a predetermined sequence in order to form the first portion, the second portion, and the cold weld joint.

16. A method as described in claim 15 wherein the material is a phase change material dispensed in a plurality of discrete droplets from the at least one ink jet print head to the target locations on each successive layer.

17. A method as described in claim 16 wherein the temperature of the droplets are at or above the flowable temperature of the material when the droplets exit the ink jet print head.

18. A method as described in claim 17 wherein the droplets start to cool when dispensed from the ink jet print head, the ink jet print head being positioned at a prearranged distance from each successive layer when dispensing the droplets, the prearranged distance being selected in order regulate the temperature of the droplets to achieve the desired temperature when they strike the target locations of a given layer in each selective dispensing step.

19. A method as described in claim 18 wherein in forming the cold weld joint the prearranged distance is substantially increased.

20. A method as described in claim 19 wherein a first prearranged distance is used when selectively dispensing the material to form the first and second portions of the object, and a second prearranged distance is used when selectively dispensing the material to form the cold weld joint.

21. A method as described in claim 20 further comprising the step of:

separating the first and second portion of the object along the cold weld joint to reveal a desired surface on the second portion, the second portion being a product formed by the method, and the first portion being a support structure formed by the method to support the product formed by the method.

22. A method as described in claim 21 further comprising the step of:

separating the first and second portion of the object along the cold weld joint to reveal a desired surface on both the first portion and the second portion, the first and second portions being mirror image parts.

23. A method for solid freeform fabrication of an object by dispensing a material to a plurality of target locations, the object having a first portion and a second portion severably attached along a cold weld joint, the method comprising the steps of:

(a) selectively dispensing the material to form the first portion, the dispensed material having sufficient energy to integrally fuse with adjacent material when striking the target locations residing in the first portion;

(b) cooling the first portion to a point where the dispensed material lack sufficient energy to integrally fuse along the cold weld joint with the first portion;

(c) selectively dispensing the material to form the second portion, the dispensed material having sufficient energy to integrally fuse with adjacent material of the second portion when striking the target locations residing in the second portion, but with insufficient energy to integrally fuse along the cold weld joint with the first portion.

* * * * *